(12) United States Patent
Tonello et al.

(10) Patent No.: US 8,395,497 B2
(45) Date of Patent: Mar. 12, 2013

(54) RADIOFREQUENCY CIRCUIT EMBEDDED ONBOARD IN A SATELLITE COMPRISING A THERMAL CONTROL SYSTEM BASED ON AN ALARM SIGNAL GENERATED BY THE REFLECTION OF POWER

(75) Inventors: Emile Tonello, Saint-Lys (FR); Damien Pacaud, Beaumont sur Leze (FR); Jean-Claude Lacombe, Tournefeuille (FR)

(73) Assignee: Thales, Neuilly sur Seine (FR)

( * ) Notice: Subject to any disclaimer, the term of this patent is extended or adjusted under 35 U.S.C. 154(b) by 193 days.

(21) Appl. No.: 13/040,928

(22) Filed: Mar. 4, 2011

(65) Prior Publication Data

US 2012/0056740 A1 Mar. 8, 2012

(30) Foreign Application Priority Data

Mar. 5, 2010 (FR) ...................................... 10 00910

(51) Int. Cl.
*G08B 1/08* (2006.01)
(52) U.S. Cl. ............... 340/539.1; 340/539.13; 340/12.5; 340/12.51; 342/173; 342/165; 342/175; 342/89
(58) Field of Classification Search ............... 340/539.1, 340/539.13, 12.5, 12.51; 342/173, 165, 175; 342/89
See application file for complete search history.

(56) References Cited

U.S. PATENT DOCUMENTS

| | | | |
|---|---|---|---|
| 6,753,807 B1 | 6/2004 | McLaughlin et al. | |
| 2003/0114182 A1 | 6/2003 | Chan et al. | |
| 2004/0121799 A1* | 6/2004 | Chiou | 455/550.1 |
| 2012/0249326 A1* | 10/2012 | Mostov | 340/539.17 |
| 2012/0253098 A1* | 10/2012 | George et al. | 600/2 |

FOREIGN PATENT DOCUMENTS

EP 1 732 231 A2 12/2006

* cited by examiner

*Primary Examiner* — Daryl Pope
(74) *Attorney, Agent, or Firm* — Baker Hostetler LLP

(57) ABSTRACT

A radiofrequency circuit embedded onboard a satellite, data being transmitted on several channels by radiofrequency signals, includes a channel corresponding to a frequency band, and a succession of gains being able to be associated with a channel so as to generate the radiofrequency signal to be transmitted on the latter. The succession includes at least one variable-gain amplifier, the radiofrequency signals thus generated being multiplexed by a multiplexer composed of bandpass filters. The successions of gains comprise a power load arranged so as to dissipate the power of signals which is reflected by the filters of the multiplexer, said load including means for generating an alarm signal representative of the power level of the reflected signals, the alarm signal being used to control the gain of the variable-gain amplifier. The subject of the invention is also a power load.

12 Claims, 3 Drawing Sheets

RADIOFREQUENCY CIRCUIT EMBEDDED ONBOARD IN A SATELLITE COMPRISING A THERMAL CONTROL SYSTEM BASED ON AN ALARM SIGNAL GENERATED BY THE REFLECTION OF POWER

CROSS-REFERENCE TO RELATED APPLICATION

This application claims priority to foreign French patent application No. FR 1000910, filed on Mar. 5, 2010, the disclosure of which is incorporated by reference in its entirety.

FIELD OF THE INVENTION

The invention relates to a radiofrequency circuit embedded onboard in a satellite comprising a thermal control system based on an alarm signal and an isolator generating such a signal. It applies notably to the fields of artificial satellites, in particular telecommunications satellites.

BACKGROUND

Artificial satellites are frequently used to implement telecommunications systems. They make it possible notably to cover geographical zones for which terrestrial networks have not been deployed, or else to interconnect distant terrestrial networks. An artificial satellite comprises a payload, that is to say a set of equipment allowing it to perform the operations for which it has been designed. For both technical and also cost reasons, the weight of this payload must be minimized. Thus, processing operations that it would be functionally appropriate to do at the satellite level are sometimes implemented at the level of the terrestrial stations of the system by reason of these constraints.

During the deployment of the system, the satellites are placed at a previously chosen orbit, the choice of this orbit being made during the design of the system. Once in orbit, it is difficult to intervene physically on a satellite, notably in the case of a fault. This must of course be taken into account by the designers, and certain circuits exhibit a certain redundancy so as to be able to replace defective resources.

A telecommunication satellite customarily transmits and receives on several distinct channels, a channel corresponding to a band of frequencies. The payload of the satellites can therefore be channeled, that is to say a set of equipment, such as for example amplifiers, are dedicated to the sending or receiving of signals on a given channel. During transmission, the transmitted signals for each channel are shaped by successions of gains associated with each channel and are multiplexed using an output multiplexer, designated in the subsequent description by the acronym OMUX with reference to the expression "Output Multiplexer". An OMUX multiplexer corresponds to an assemblage of radiofrequency filters. The signal resulting from the multiplexing is thereafter directed toward a broadband transmission antenna. The filters of the OMUX are, for example, bandpass filters which are allocated to the various transmission channels and make it possible to prevent the signal transmitted on a channel from interfering with the signals of the adjacent channels. A portion of the signal generated by the equipment associated with a channel may be reflected for example at the level of the OMUX multiplexer, this portion corresponding to the frequencies of the signal not belonging to the passband of the filter. These reflections may be the consequence of human error resulting for example from erroneous frequency programming by an operator of a ground control station. These reflections may also be the consequence of malfunctions or poor programming of the equipment of the payload carrying out the steering of the high-power signals output by the gain succession of the channels toward the filters of the OMUX, this equipment being called switches in the subsequent description. Faults may also give rise to reflections, notably if the onboard oscillator used for the frequency transposition of the signal to be transmitted is defective. Moreover, if the satellite is used as a repeater, a fault on the ground involving a shift in the frequency of the signal received by the satellite will give rise to a shift at the level of the transmission channel and therefore reflections at the level of the filters of the OMUX. Moreover, poor adaptation of the output of the repeater may also induce signal reflections.

The radiofrequency power resulting from these reflections must be dissipated so as to guarantee good operation in transmission. For this purpose, existing solutions position high-power isolators (customarily designated by the acronym HPI) composed of a circulator and of a power load, in the successions of radiofrequency gains.

The reflections mentioned induce a dissipation of power in thermal form, and the temperature of the circuits such as the OMUXs and the power loads may increase considerably until they are irreparably damaged.

In order to avoid this, existing solutions for thermal detection propose measuring the temperature at the level of the filters of the OMUX multiplexer with the aid of thermistors, said thermistors generating measurement signals processed by an embedded processor aboard the satellite. The main drawback of these solutions is their reaction time which is of the order of several tens of seconds before the components are adjusted so that the temperature falls.

SUMMARY OF THE INVENTION

The invention notably alleviates the aforementioned drawbacks.

For this purpose the subject of the invention is a radiofrequency circuit embedded, or configured to be embedded, onboard a satellite, data being transmitted on several channels by radiofrequency signals, a channel corresponding to a frequency band, a succession of gains being able to be associated with a channel so as to generate the radiofrequency signal to be transmitted on the latter, said succession comprising at least one variable-gain amplifier, the radiofrequency signals thus generated being multiplexed by a multiplexer composed of bandpass filters. The successions of gains comprise a power load arranged so as to dissipate the power of signals which is reflected by the filters of the multiplexer, said load comprising means for generating an alarm signal A(t) representative of the power level of the reflected signals, this alarm signal being used to control the gain of the variable-gain amplifier.

According to one aspect of the invention, control modules associated with the successions of gains comprise means for determining control setpoints for the variable-gain amplifier of said successions, said setpoints being deduced from the comparison between a quantity representative of the alarm signal A(t) and a predefined threshold value S.

According to another aspect of the invention, the quantity representative of the alarm signal is its current strength or its voltage.

The setpoint generated by a control module is, for example, such that the variable-gain amplifier of at least one succession of gains is deactivated when the value representative of the alarm signal is greater than or equal to the threshold value S.

The subject of the invention is also a power load composed of a hollow waveguide piece designed as a short circuit, comprising an opening through which an input signal to be attenuated is introduced, said signal being attenuated by an absorbent material included in the waveguide piece. The power load comprises a radiofrequency detector, said detector being positioned at the end opposite from the opening of the waveguide piece, said piece being such that it lets through a portion of power of the input signal at the level of its end closest to the detector, the radiofrequency detector converting this portion of power into an alarm signal A(t).

The radiofrequency detector is, for example, a detector based on diodes or on transistors.

In an embodiment, the portion of power of the incoming signal is transmitted to the radiofrequency detector by coupling.

The alarm signal corresponds, for example, to a voltage or a current strength dependent on the incident power of the portion of power present at the input of the detector.

The advantage of the invention is notably that it can be implemented entirely in the radiofrequency part of the onboard circuits, thereby easing the design of the circuits. Furthermore, the radiofrequency engineer will not have to interact with other professionals when designing circuits implementing the invention, such as for example thermal engineers.

Another advantage is that the weight of the satellite payload may be reduced by several kilos when the proposed solution is implemented.

BRIEF DESCRIPTION OF THE DRAWINGS

Other characteristics and advantages of the invention will become apparent with the aid of the description which follows given by way of nonlimiting illustration, offered with regard to the appended drawings among which.

DETAILED DESCRIPTION

Figure 1:
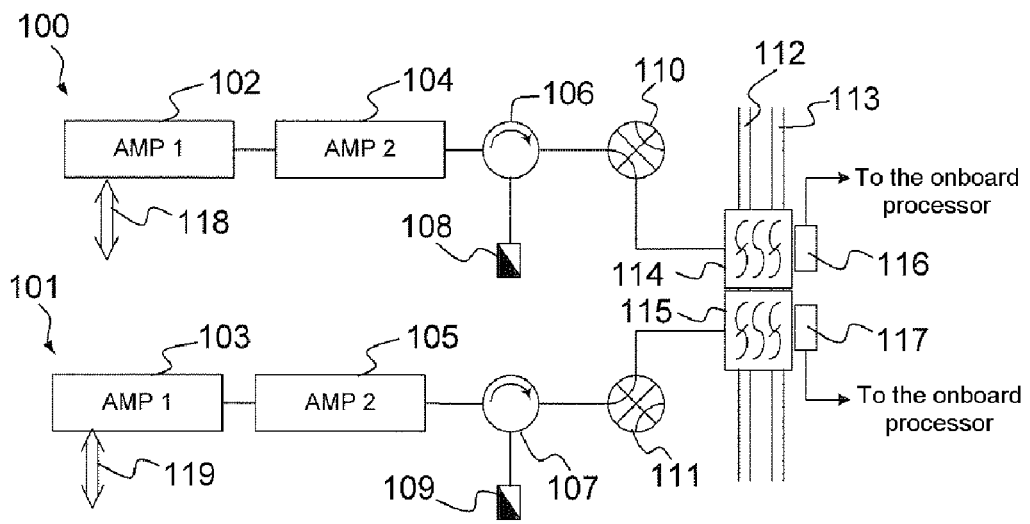
FIG. 1 gives an example of an onboard radiofrequency circuit comprising a thermal detection system.

FIG. 1 gives an example of an onboard radiofrequency circuit comprising a thermal detection system. This example makes it possible to transmit signals on two channels. For this purpose, two successions of gains 100, 101 are used. The first succession of gains 100 comprises, for example, a first gain-controllable amplifier 102, called a channel amplifier. This amplifier receives a signal to be transmitted on the channel associated therewith as well as control commands originating from an onboard processor, likewise embedded in the satellite. The signal amplified by the first amplifier 102 is amplified again by a second amplifier 104, the latter being a power amplifier, for example of the traveling wave tube type. This amplifier 104 is designated in the subsequent description by the acronym TWTA deriving from the expression "Traveling Wave Tube Amplifier". The signal thus amplified is transmitted through a circulator 106, and then through a switch 110 carrying out the steering between successions of gains toward one of the bandpass filters 114 of an OMUX multiplexer. A cooling system composed of heat pipes 112, 113 helping to discharge the heat into space by radiation. Taking account of the bulkiness constraints on a satellite, they cannot be dimensioned to dissipate the whole of the power in the case of abnormal operation. So as to enhance the thermal control, a thermistor 116 is placed in the neighborhood of the filter 114 so that the latter generates a signal representative of the temperature of said filter. This signal is thereafter transmitted to an embedded processor onboard the satellite. As a function of signal, the processor determines a command making it possible to reduce the gain of the channel amplifier 102 so as to decrease the thermal dissipation and thus avoid impairments to the components of the system.

The second succession of gains 101 is associated with the second transmission channel. Elements of the same types as those represented in the first succession 100 are used, that is to say a channel amplifier whose gain is digitally controllable 103, a TWTA amplifier 105, a circulator 107, a switch 111, one of the bandpass filters 115 of the OMUX multiplexer and a measurement thermistor 117 generating a signal directed toward the onboard processor.

The power reflected at the level of the filters of the OMUX multiplexer is directed by the circulators 106, 107 of the various channels toward a power load 108, 109 associated with each pathway, said power then being dissipated in the form of heat.

As indicated previously, a drawback of this type of technique is its reaction time, since the thermistors 116, 117 exhibit thermal inertia characteristics inducing a significant delay in the detection of the variations in measured temperature. This lack of reactivity of the system with respect to temperature variations may result in irreversible damage to the onboard telecommunications equipment.

Figure 2:
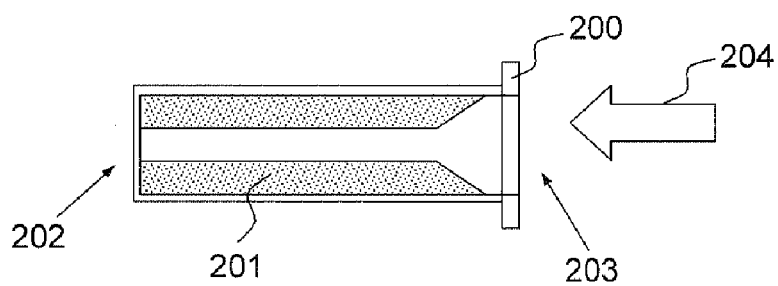
FIG. 2 gives an example of a power load.

FIG. 2 gives an example of a power load for a high-power isolator. These power loads are customarily composed of a waveguide piece 200, for example made from aluminum of rectangular or other shape. This waveguide comprises an absorbent material 201, for example Silicon Carbide SiC RS-4200 CHP and is open at one of its ends 203 and closed at the other 202 so as to form a short circuit. It then operates as a power load.

Thus, when such an isolator is used to dissipate the power reflected at the level of the OMUX multiplexer, the reflected signal 204 is directed by a circulator toward the power load, such as described previously, enters the waveguide and is dissipated therein.

Figure 3:
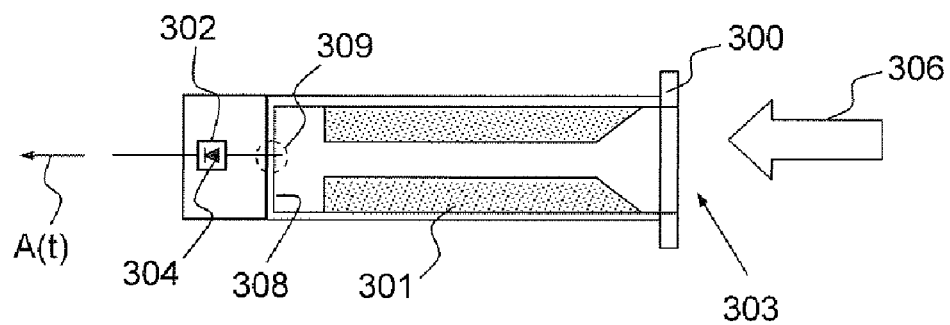
FIG. 3 presents an improved power load comprising a radiofrequency detector.

FIG. 3 presents an improved power load comprising a radiofrequency detector. This power load is composed of a waveguide piece 300, for example made from aluminum and of rectangular or cylindrical shape. Said waveguide comprises an opening 303 through which the input signal to be attenuated 306 enters. The attenuation is carried out by virtue of the use of an absorbent material 301. In this embodiment, a radiofrequency detector 302 is excited by a signal passing through a coupling element 308 positioned at the end of the power load, that is to say in at the level of the end opposite from the opening 303. The waveguide is designed as a short circuit but in such a way as to let through a portion of power at the level of its end 308 in contact with the detector 302, for example by coupling. The radiofrequency detector is for example a detector based on diodes. This portion of power is converted into an alarm signal A(t) by the detector 302. This alarm signal corresponds to a voltage or a current strength dependent on the incident power at the input of the detector 302. This alarm signal can then be used in such a way as to control the radiofrequency components of the succession of gains with which the isolation and alarm device is associated so as to reduce the temperature of the components in the case of an anomaly.

Figure 4:
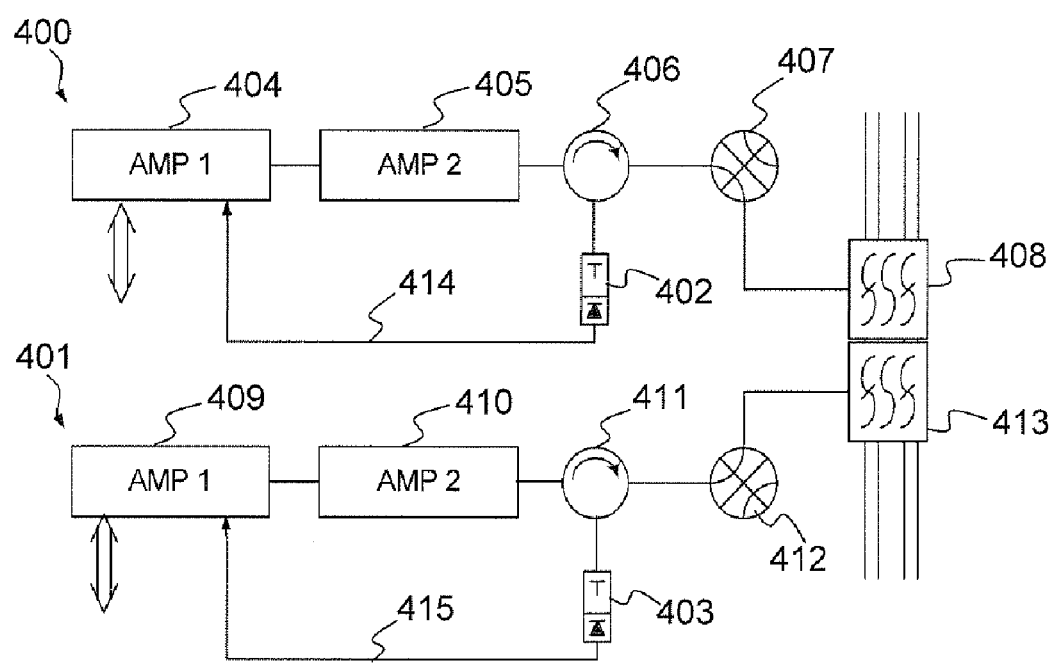
FIG. 4 gives an example of an onboard radiofrequency circuit comprising a gain system based on an alarm signal.

FIG. 4 gives an example of an onboard radiofrequency circuit comprising a thermal control system based on an alarm signal.

The example of the figure comprises two successions of gains 400, 401. For each channel, the same elements as those described in the channels of FIG. 1 are represented, that is to say and for each channel, a gain-controllable channel amplifier 404, 409, a power amplifier 405, 410, a circulator 406, 411, a switch 407, 412, and an OMUX multiplexer composed of several bandpass filters 408, 413.

The circulators direct the reflected signals toward high-power loads comprising a radiofrequency detector 402, 403. These isolators generate an alarm signal directed by a conductor line 414, 415 toward the channel amplifier 404, 409. A control module for the amplifier then makes it possible to adjust the gain of said amplifier as a function of the voltage/of the current strength of said signal. The control module is for example integrated into the channel amplifier. In an alternative embodiment, the latter may be implemented outside the amplifier.

Figure 5:
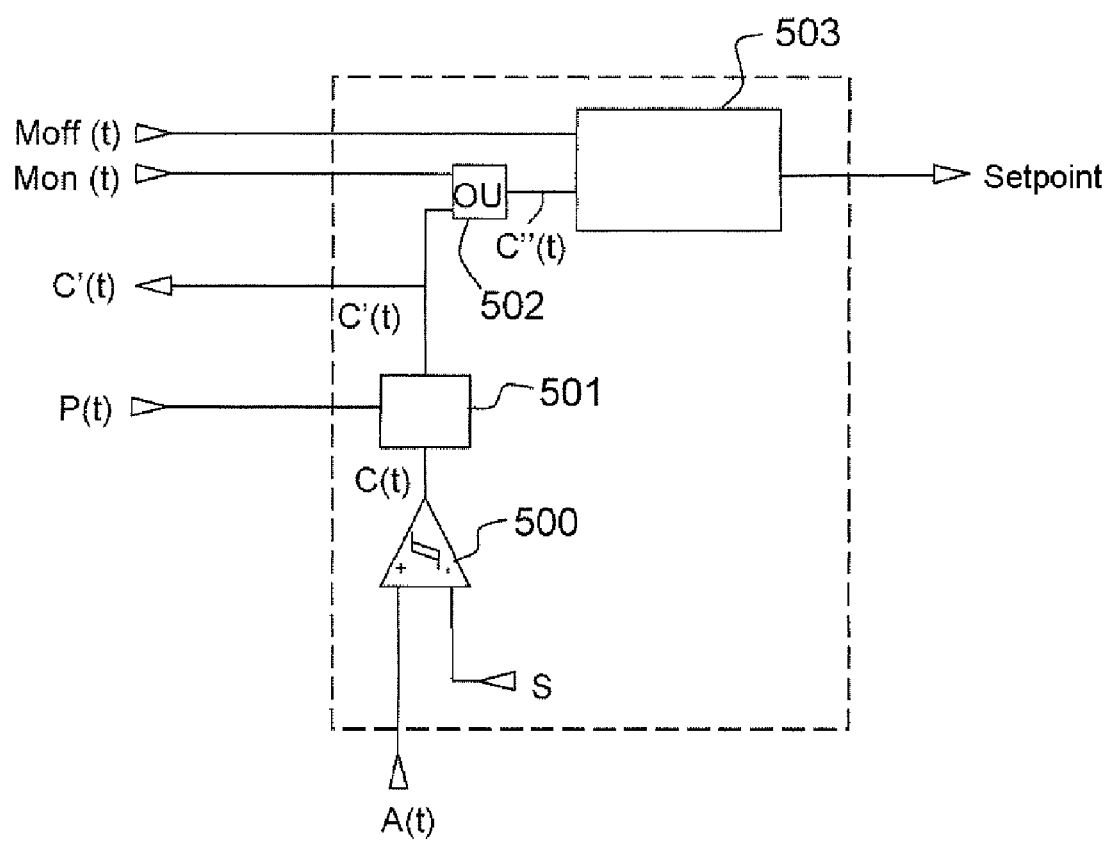
FIG. 5 gives an example of a control module for a channel amplifier.

FIG. 5 gives an example of a control module for a channel amplifier. The alarm signal A(t) generated by the radiofrequency detector of the previously described power load is directed toward this control module. The latter is introduced into a threshold-based comparator 500 so as to be compared with a threshold signal S. The value of the threshold signal S is a stored constant but may be modified for programming of the control module. The output signal from the comparator 500 is a binary signal C(t) corresponding to a '0' or to a '1'. The comparison is such that, for example:

$$A(t) < S \Rightarrow C(t) = 0$$

$$A(t) \geq S \Rightarrow C(t) = 1$$

A breaker circuit 501 makes it possible to activate or to deactivate the taking into account of the signal C(t), this being equivalent to activating or deactivating the protection against thermal escalations. For example, a binary signal P(t) makes it possible to control this activation such that if P(t)=0, the circuit output signal C'(t) is forced to 0, and if P(t)=1, C'(t)=C(t).

The signal C'(t) is available as control module output and makes it possible to indicate what is the state of the control to the onboard computer.

The signal C'(t) is also used as input to a logic OR gate 502, the second input corresponding to a binary command signal Mon(t), the signal C'(t) being taken into account for the control of the amplifier when, for example, Mon(t)=1. Stated otherwise, the output signal C"(t) from the OR gate 502 is such that C"(t)=C'(t) when Mon(t)=1 and is forced to 0 if Mon(t)=0.

A module for calculating the control setpoint 503 determines a control setpoint as a function of the value of the signal C'(t). This setpoint may be a command making it possible to deactivate the channel amplifier associated with the control module or else an adjustment command for the gain of said amplifier, taking account of the variations of the signal C'(t) over a given time interval. The calculation of the setpoint may be activated or deactivated with the aid of a signal Moff(t).

In the proposed solution, the reaction time making it possible to take account of an abnormal escalation in the temperature is particularly short. Indeed, the reaction time of the detector as well as the time required by the control module to calculate the setpoint are of the order of a few milliseconds. This order of magnitude is to be compared with that associated with the prior art systems, such as for example those based on thermistors, whose reaction time may be as much as several tens of seconds.

In certain embodiments, the radiofrequency multiplexers are designed so as to withstand temperature increases due to the out-of-band signals. With the implementation of a thermal control system based on an alarm signal, the constraints due to these dissipations are less significant and it is then possible to dimension the filters of the multiplexer such that a saving of the order of 80 grams can be achieved per channel, this being equivalent to several kilos for the onboard radiofrequency circuit as a whole.

The invention claimed is:

1. A radiofrequency circuit configured to be embedded onboard a satellite, data being transmitted on several channels by radiofrequency signals, a channel corresponding to a frequency band, a succession of gains being able to be associated with a channel so as to generate the radiofrequency signal to be transmitted on the latter, said succession comprising at least one variable-gain amplifier, the radiofrequency signals thus generated being multiplexed by a multiplexer composed of bandpass filters, wherein the successions of gains comprise a power load arranged so as to dissipate the power of signals which is reflected by the filters of the multiplexer, said load comprising means for generating an alarm signal representative of the power level of the reflected signals, said alarm signal being used to control the gain of the variable-gain amplifier.

2. The circuit according to claim 1, wherein control modules associated with the successions of gains comprise means for determining control setpoints for the variable-gain amplifier of said successions, said setpoints being deduced from the comparison between a quantity representative of the alarm signal and a predefined threshold value.

3. The circuit according to claim 2, wherein the quantity representative of the alarm signal is its current strength or its voltage.

4. The circuit according to claim 2, wherein the setpoint generated by a control module is such that the variable-gain amplifier of at least one succession of gains is deactivated when the value representative of the alarm signal is greater than or equal to the threshold value.

5. A satellite comprising a circuit according to claim 1, said circuit being embedded onboard said satellite.

6. The satellite according to claim 5, wherein control modules associated with the successions of gains comprise means for determining control setpoints for the variable-gain amplifier of said successions, said setpoints being deduced from the comparison between a quantity representative of the alarm signal and a predefined threshold value.

7. The satellite according to claim 6, wherein the quantity representative of the alarm signal is its current strength or its voltage.

8. The satellite according to claim 6, wherein the setpoint generated by a control module is such that the variable-gain amplifier of at least one succession of gains is deactivated when the value representative of the alarm signal is greater than or equal to the threshold value.

9. A power load composed of a hollow waveguide piece designed as a short circuit, comprising an opening through which an input signal to be attenuated is introduced, said signal being attenuated by an absorbent material included in the waveguide piece, wherein it comprises a radiofrequency detector, said detector being positioned at the end opposite from the opening of the waveguide piece, said piece being such that it lets through a portion of power of the input signal at the level of its end closest to the detector, the radiofrequency detector converting this portion of power into an alarm signal.

10. The power load according to claim 9, wherein the radiofrequency detector is a detector based on diodes or on transistors.

11. The power load according to claim 9, wherein the portion of power of the incoming signal is transmitted to the radiofrequency detector by a coupling.

12. The power load according to claim 9, wherein the alarm signal corresponds to a voltage or a current strength dependent on the incident power of the portion of power present at the input of the detector.

* * * * *